United States Patent [19]

Bril et al.

[11] 4,439,294

[45] Mar. 27, 1984

[54] REACTIVE ION ETCHING OF SOFT-MAGNETIC SUBSTRATES

[75] Inventors: Thijs W. Bril, Sunnyvale, Calif.; Willibrordus G. M. van den Hoek, Eindhoven, Netherlands

[73] Assignee: U.S. Philips Corporation, New York, N.Y.

[21] Appl. No.: 463,202

[22] Filed: Feb. 2, 1983

[30] Foreign Application Priority Data

Feb. 12, 1982 [NL] Netherlands .......................... 8200532

[51] Int. Cl.³ ............................................. C23C 15/00
[52] U.S. Cl. .............................. 204/192 E; 204/163 R
[58] Field of Search ...................... 156/643; 204/192 E

[56] References Cited

U.S. PATENT DOCUMENTS

| | | | |
|---|---|---|---|
| 4,016,062 | 4/1977 | Mehta et al. ................... | 204/192 E |
| 4,226,691 | 10/1980 | Cunningham ................... | 204/192 E |
| 4,238,277 | 12/1980 | Bril et al. ........................ | 204/192 E |
| 4,295,924 | 10/1981 | Garnache et al. ................ | 156/643 |
| 4,299,680 | 11/1981 | Fontana et al. .................. | 156/643 |
| 4,375,390 | 3/1983 | Anderson et al. ................ | 156/643 |

OTHER PUBLICATIONS

Chang et al., IBM Research Disclosure Bull.; 14 (1972), p. 249.

*Primary Examiner*—Arthur P. Demers
*Attorney, Agent, or Firm*—Joseph P. Abate

[57] ABSTRACT

A method of providing grooves in a body of a soft-magnetic, iron-containing material. The method includes reactive ion etching the body in a chlorine-containing or bromine-containing plasma after providing the body areas not to be etched with a mask of an inorganic material such as $Al_2O_3$.

7 Claims, 7 Drawing Figures

REACTIVE ION ETCHING OF SOFT-MAGNETIC SUBSTRATES

BACKGROUND OF THE INVENTION

The invention relates to a method of providing grooves in a substrate of a soft-magnetic, iron-containing material selected from the group consisting of ferrites, Ni-Fe alloys and Al-Fe-Si alloys.

In manufacturing magnetic transducer heads having cores consisting of a soft-magnetic, iron-containing material such as a ferrite, the ferrite for the core of the head should sometimes be provided with grooves. One of the known methods consists in grinding grooves in a set of ferrite blocks which are then bonded together. However, such a mechanical operation does not provide sufficient dimensional accuracy. This is the case in particular when manufacturing a video head which requires a high degree of accuracy. It is hence difficult to manufacture magnetic heads economically with the same characteristics. Moreover, mechanical operations cause defects and the magnetic properties of the ferrite deteriorate as a result of the stresses introduced. In this connection, it is to be noted that even the working of a magnetic ferrite by means of a laser introduces undesired stresses.

Methods which do not introduce stresses are wet chemical (and electrolytic) etching. In these methods, a concentrated acid, for example, concentrated phosphoric acid, is used.

A masking layer is provided on the (ferrite) article. The layer is then provided photographically with a desired pattern; selected portions being subsequently removed by the developing. In electrolytic etching, this is succeeded by dipping in an electrolytic cell in which the (ferrite) article and an electrode are dipped in an etching electrolyte bath opposite to each other and at a distance from each other and the (ferrite) article serves as a cathode, and in which etching takes place in the exposed zones. Of the ferrites, Mn-Zn ferrite can be etched in this manner but Ni-Zn ferrite, which has a lower conductivity, cannot be etched in this manner. (An extra problem of Ni-Zn ferrite is that it etches inhomogeneously in a wet chemical etching process). A disadvantage of electrolytic etching is that the electrolyte can creep below the masking layer beyond the boundaries of the pattern lines as a result of which a certain amount of undercutting or lateral etching may occur. Moreover, electrolytic etching is not suitable for etching relatively deep grooves because it is a so-called diffusion-restricted process.

SUMMARY OF THE INVENTION

It is the object of the present invention to provide an improved method of providing grooves in a substrate of soft-magnetic, iron-containing material, in particular, of a Mn-Zn-ferrous ferrite or Ni-Zn ferrite, and is characterized in that it includes reactive ion etching the substrate in a chlorine-containing or bromine-containing plasma, the areas not to be etched being covered by a mask of an inorganic material which is not substantially more rapidly etched than the soft-magnetic, iron-containing material.

It has been found that grooves provided in the above-described manner in a body of a soft-magnetic, iron-containing material show no or hardly any undercutting. Thus, grooves having a considerable depth can be formed. In addition, although iron in combination with chlorine or bromine is not volatile, the etching rate of the material in question unexpectedly is nevertheless so high that the process can be used on an industrial scale.

It is important that the process should take place in a sputter etching system which enables the supply of sufficiently high powers. In a practical embodiment, good results were achieved, for example, with powers from 0.5–2.5 W/cm$^2$. The required high powers ($10^2$–$10^3$e v) can be realized in particular when the process is carried out in an a symmetric sputter etching system.

An important aspect is to use a mask material which is not etched away substantially more rapidly than the material of the article to be etched. Materials of an organic nature (lacquer) have been found not to satisfy these requirements. Al, Ni and alloys of Ni and Fe have been found to be etched away approximately equally rapidly as ferrites and, hence, may serve as a mask material in the reactive ion etching process of ferrites.

In one embodiment, $Al_2O_3$ is used as a mask material in etching ferrite. This is etched away five to ten times more slowly than ferrites are etched.

In one embodiment, the process is carried out in a sputter etching system in which a chlorine-containing or bromine-containing plasma is present having a partial pressure of approximately $10^{-2}$ torr. This is a comparatively low pressure for this kind of process, which is pressure used because no reaction products must condense on the etched product.

BRIEF DESCRIPTION OF THE DRAWING

An embodiment of the invention will be described with reference to the accompanying drawings, in which.

DESCRIPTION OF THE PREFERRED EMBODIMENT

Figure 1:
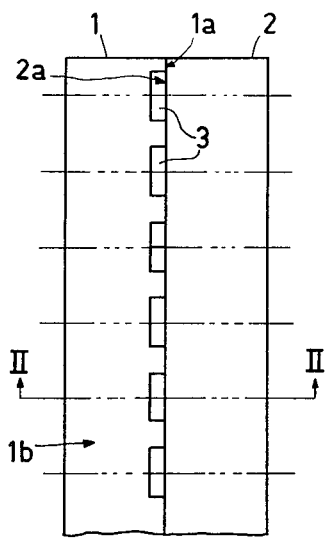
FIG. 1 is a front elevation of two ferrite core blocks cemented together.
Figure 2:
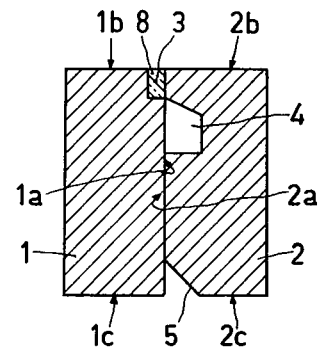
FIG. 2 is a cross-sectional view taken on the line II—II of FIG. 1.

A method of providing grooves in ferrite transducing heads will be described with reference to FIGS. 1 to 5. Two ferrite core blocks 1 and 2 are bonded together by cementing their respective surfaces 1a and 2a together. The surface 1a of block 1 comprises a number of grooves 3 which determine the track width and which extend parallel to each other at a previously determined distance. As will be described in detail hereinafter, said grooves are provided by means of a reactive ion etching process. The surface 2a of block 2 is provided with a recess 4 for accommodating a winding which is located at a small distance from the surface 2b which lies in the same plane as the surface 1b of block 1; said recess 4 defining the depth of a non-magnetic gap which crosses the grooves 3. Block 2 is also provided with a notch 5 the face of which is bounded on one side by the surface 2a and on the other side by a surface 2c which lies in the same plane as a surface 1c of the block 1.

When the blocks 1 and 2 are bonded together, the surfaces 1a and 2a are placed opposite to each other with the surfaces 1c and 2c uppermost and the surfaces 1b and 2b lowermost. Glass rods (not shown) are then inserted into the notch 5 and into the recess 4, after which the assembly is heated until the glass of the rods melts so as to bond the blocks 1 and 2 after cooling.

Figure 3:
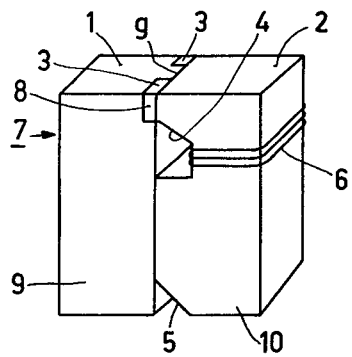
FIG. 3 is a perspective view of a magnetic head obtained by suitably cutting the assembly of FIGS. 1 and 2.

The bonded blocks 1 and 2 are then cut in such a manner that each cutting face extends through a groove 3 in the longitudinal direction thereof, as is shown in broken lines in FIG. 1. A winding 6 is then provided around block 2 through the recess 4 (FIG. 3). A magnetic head 7 shown in FIG. 3 comprises a glass deposit 8 in each groove 3, a core half 9 formed by block 1, and core half 10 formed by block 2. Between the core halves 9 and 10, a non-magnetic operating space g is present the length of which, in the direction of the track width, is bounded by the grooves 3 and the depth is bounded by the recess 4.

Figure 4:
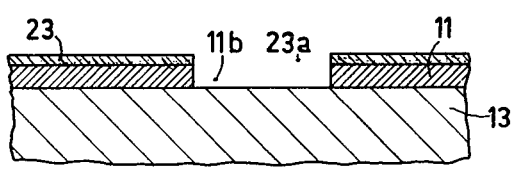
FIGS. 4 and 5 illustrate diagrammatically the reactive ion etching step of the invention on a considerably enlarged scale.
Figure 5:
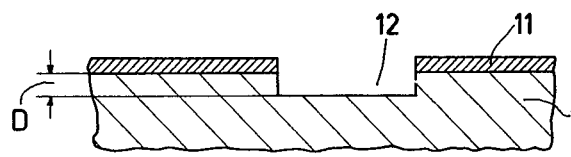

In order to avoid the disadvantages of the known methods, the invention includes a reactive ion etching step two stages of which are shown diagrammatically in FIGS. 4 and 5. Prior to this step an etching mask 11 is provided on a (ferrite) body 13 and comprises, for example, a window 11b the location of which coincides with a groove to be formed on the article 13 as is shown in FIG. 5. The etching mask 11 may be formed by first providing a masking layer on the ferrite and providing thereon a photosensitive lacquer layer 23, exposing the lacquer layer 23 picture-wise and then developing, usually with a solvent, so as to provide a previously determined pattern having a window 23a. The masking layer 11 is then etched through the window 23a of the lacquer layer with a concentrated acid so as to form a window 11b.

The use of the method according to the invention in, for example, the manufacture of magnetic heads imposes high requirements upon the accuracy of the mask. For example, after etching, zones should remain in a width of 20 $\mu$m and a length of 50 $\mu$m and having walls extending substantially normal to the surface. It is hence of importance that the walls of the apertures in the mask also extend normal to the surface. For the realization of such a mask, several methods are possible.

A first method consists in the defined growth (by electrodeposition) of the mask in a lacquer pattern. A wet chemical etching process is not necessary then. Such a process generally etches isotropically and gives rise to the formation of walls which make an angle unequal to 90° with the surface. Materials which can be grown in a defined manner are Ni and any alloy of Ni and Fe. Therefore, these materials are suitable to serve as a mask material in the method in accordance with the invention. Preferably, a mask consisting of Ni or of an alloy of Ni and Fe is grown on the substrate by electrodeposition in a lacquer pattern. Al is etched away approximately equally as rapidly as Ni but because it cannot be grown in a defined manner in a lacquer layer, it should be subjected, after sputtering in a layer form, to an etching process so as to provide the desired pattern.

When the article to be etched consists of a ferrite, it is important for the mask material during the reactive ion etching process of the etching step not to be etched away substantially more rapidly than the ferrite. Ni and alloys of Ni and Fe as well as Al, are etched away approximately equally as rapidly as ferrites. Ag, Cr and $SiO_2$ are etched away more rapidly than ferrites and organic materials such as lacquers are etched away many times rapidly; Ag, Cr and $SiO_2$ are less suitable, and organic materials are unsuitable mask materials when it relates to etching articles of ferrites, certainly when etching has to be carried out down to depths exceeding 1 or 2 $\mu$m. Although each time when the mask has been etched away and the desired depth has not yet been reached a fresh mask could be provided, this is a very uneconomic method.

The material found most suitable so far in this respect is $Al_2O_3$ which, in combination with HCl as a plasma, is etched away five to ten times more slowly than ferrites. In order to obtain an $Al_2O_3$ mask having apertures with straight walls, an $Al_2O_3$ layer should be exposed to an anisotropic etching process. For this purpose, a reactive ion etching process may advantageously be used in which, in addition to chlorine-containing or bromine-containing plasmas, in particular $CHF_3$ is to be considered as a reactive gas since it has been found to attack the lacquer pattern provided on the etching mask to a minimum extent as a result of which well defined etching of the mask is possible. An extra advantage of the reactive ion etching of the mask is that the subsequent reactive ion etching process of the article to be etched can be carried out in the same sputter etching apparatus, if desired, after adaptation of the etching parameters (type of gas, gas pressure, R.F. power) to the material of which the article to be etched consists. For example, ferrites cannot be etched with $CHF_3$. Chlorine-containing plasmas such as HCl, $BCl_3$, $Cl_2$ have proven suitable for this purpose. An important aspect is that they least pollute the sputter etching system upon etching ferrite.

Figure 6:
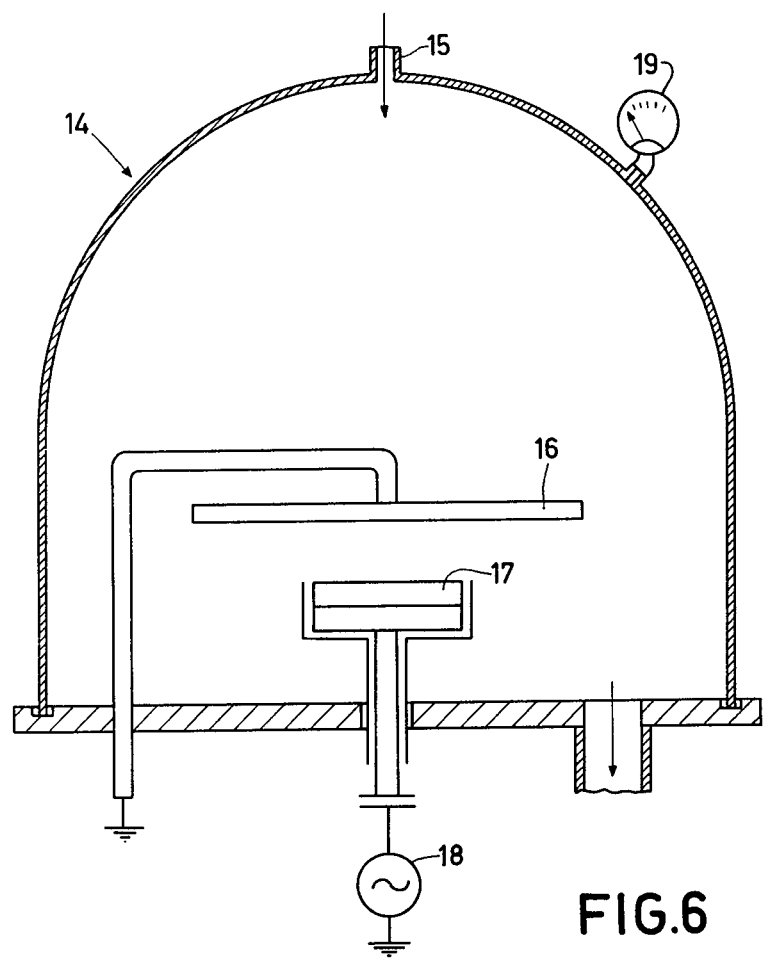
FIG. 6 diagrammatically shows an apparatus for carrying out the reactive ion etching step of the invention.

A sputter etching system suitable for the method of the invention is that shown in FIG. 6. It shows an asymmetric sputter etching system 14 having an electrode 17 and a counter electrode 16 which is connected to an R.F. source 18. Due to the asymmetric construction of the system 14, it is possible to perform the etching of the articles at the required high powers of 0.5–2.5 W/cm$^2$. It is to be noted that there is a linear relationship between the power and the etching rate. The higher the etching rate which is required (for example, when the grooves become very deep) the larger must be the power of source 18. The R.F. power, the pressure and the flow of the reactive gas which is admitted through an inlet 15 are adjusted so that reaction products released during the reaction just do not condense on the article to be etched. For that purpose, etching is carried out at comparatively low pressure in the 10$^{-2}$ Torr range.

Locations 12 on the ferrite article 13 to be processed, which are destined, for example, for the grooves 3 for restricting the track width, for, the recess 4 for receiving the winding 6 or for the notch 5, can be reached through the windows 11b by means of the etching process, while the remaining part remains covered with an etching mask layer 11 (see FIG. 5).

The reactive ion etching process according to the invention provides a comparatively deep but, nevertheless, readily defined etching.

Moreover, the etching rate is considerably faster than that of sputter etching methods in non-reactive gases like Ar. These latter methods, as well as wet chemical ones, have the additional disadvantage that the crystal boundaries in polycrystalline materials are subjected to initial etching which results in moon landscape-like surfaces.

Thus the method according to the invention makes it possible to produce, with great accuracy, fine and comparatively deep patterns in ferrites on an industrial scale.

Figure 7:
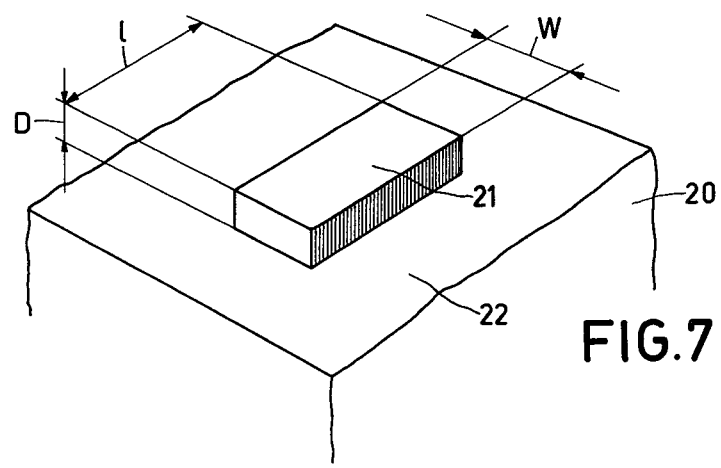
FIG. 7 shows diagrammatically a block of ferrite processed by means of the invention.

FIG. 7 shows diagrammatically a small area of an etched Mn-Zn ferrite body 20 after removing the etching mask. A zone 21 is a region where the ferrite was not etched. The depth D of the grooves 22 which surround the zone 21 entirely was 12 $\mu$m, while the dimensions W and l of the zone 21 were 20 and 50 $\mu$m, respectively.

Besides its use for making gap-bounding grooves, the method in accordance with the invention for the reactive ion etching of ferrite can also be used for making grooves in which conductor turns (so-called "buried coils") are incorporated; for making aerodynamic grooves in the gliding surface of a head assembly for disc memories (so-called "magnetic head glider"); or for making non-magnetic interruptions in the ferrite which are bridged by a magnetic element to form a magnetic circuit.

The method of the invention can be applied both to monocrystalline ferrites and to polycrystalline ferrites.

Furthermore, the etching method of the invention may be used, besides in soft-magnetic, iron-containing materials such as Mn-Zn or Ni-Zn ferrites, also in other soft-magnetic iron-containing materials, for example, Ni-Fe alloys and Al-Fe-Si alloys.

Good results are obtained, for example, when a method of the invention is to etch Mn-Zn-ferrous ferrites having a composition as regards the metal shares within a triangle ABC in a ternary composition diagram of the MnO-ZnO-$Fe_2O_3$ system, where the points A, B and C define the following compositions:

A: 15 mol % MnO, 30 mol % ZnO, 55 mol % $Fe_2O_3$;
B: 40 mol % MnO, 20 mol % ZnO, 40 mol % $Fe_2O_3$;
C: 30 mol % MnO, 15 mol % ZnO, 55 mol % $Fe_2O_3$.

As stated above, the method of the invention permits of etching a ferrite to provide very accurately defined grooves so that when used in the manufacturing of a magnetic head of ferrite, the disadvantages involved in the known electrolytic etching processes do not occur.

What is claimed is:

1. A method of providing grooves in a substrate of a soft-magnetic, iron-containing material selected from the group consisting of ferrites, Ni-Fe alloys and Al-Fe-Si alloys, comprising reactive ion etching the substrate in a chlorine-containing or bromine-containing plasma, the substrate areas not to be etched being covered by a mask of an inorganic material which is not substantially more rapidly etched than the soft-magnetic, iron-containing material.

2. A method as claimed in claim 1, characterized in that the substrate is Mn-Zn-ferrous ferrite or Ni-Zn ferrite and is provided, prior to the etching step with a mask of a material selected from the group of materials consisting of Ni, alloys of Ni and Fe, and Al.

3. A method as claimed in claim 2, characterized in that the Ni and the alloys of Ni and Fe, respectively, are grown on the substrate by electrodeposition through a lacquer pattern.

4. A method as claimed in claim 1, characterized in that the substrate consists of Mn-Zn-ferrous ferrite or Ni-Zn ferrite and is coated, prior to the etching step with a mask of $Al_2O_3$.

5. A method as claimed in claim 4, characterized in that the $Al_2O_3$ mask is formed by making a pattern in an $Al_2O_3$ layer by means of a reactive ion etching process.

6. A method as claimed in claim 1, characterized in that the reactive ion etching step is carried out with powers from 0.5–2.5 W/cm$^2$.

7. A method as claimed in claim 6, characterized in that the reactive ion etching step is carried out in a chlorine-containing or bromine-containing plasma having a partial pressure of approximately $10^{-2}$ Torr.

* * * * *